United States Patent Office 3,383,643
Patented May 14, 1968

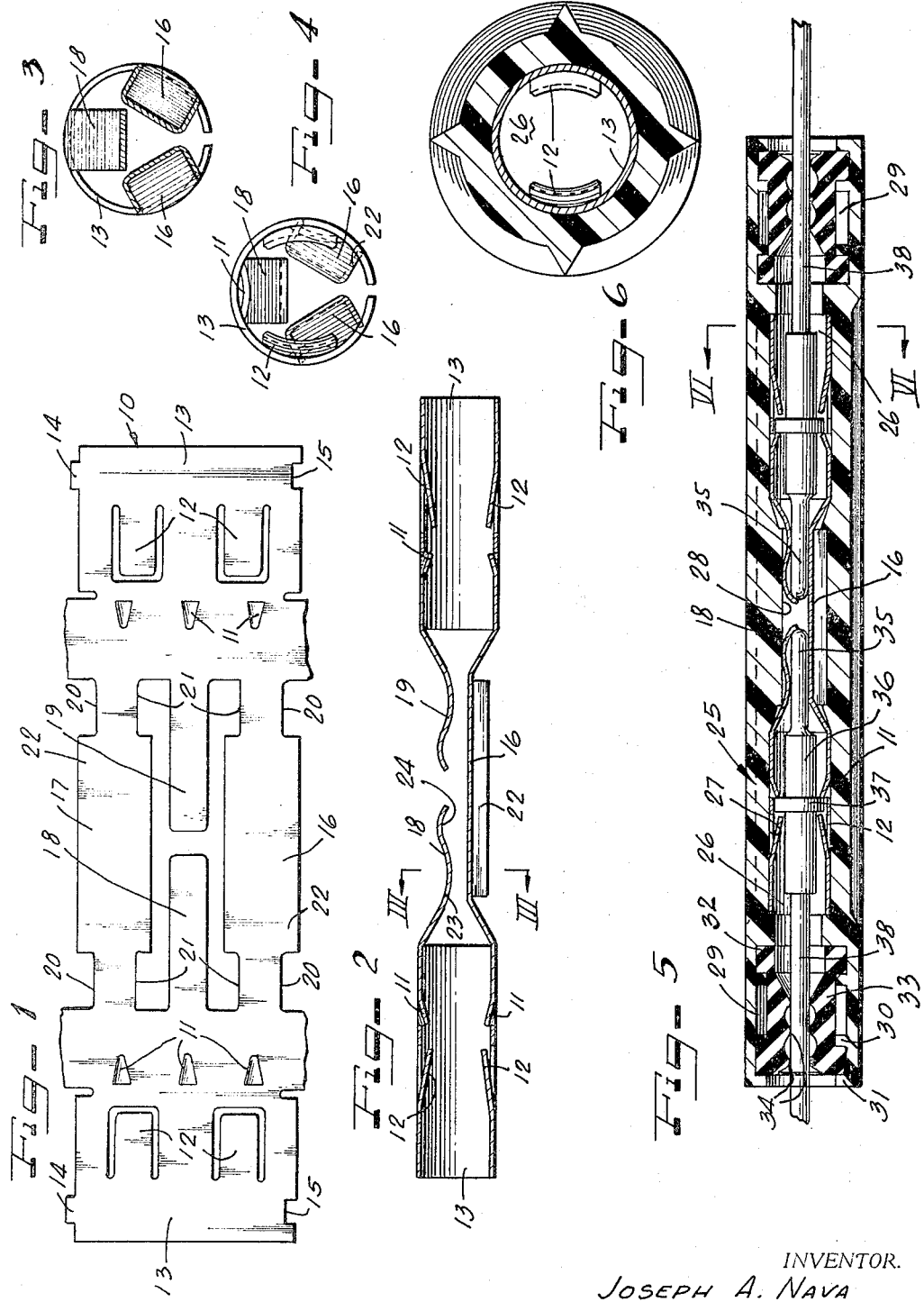

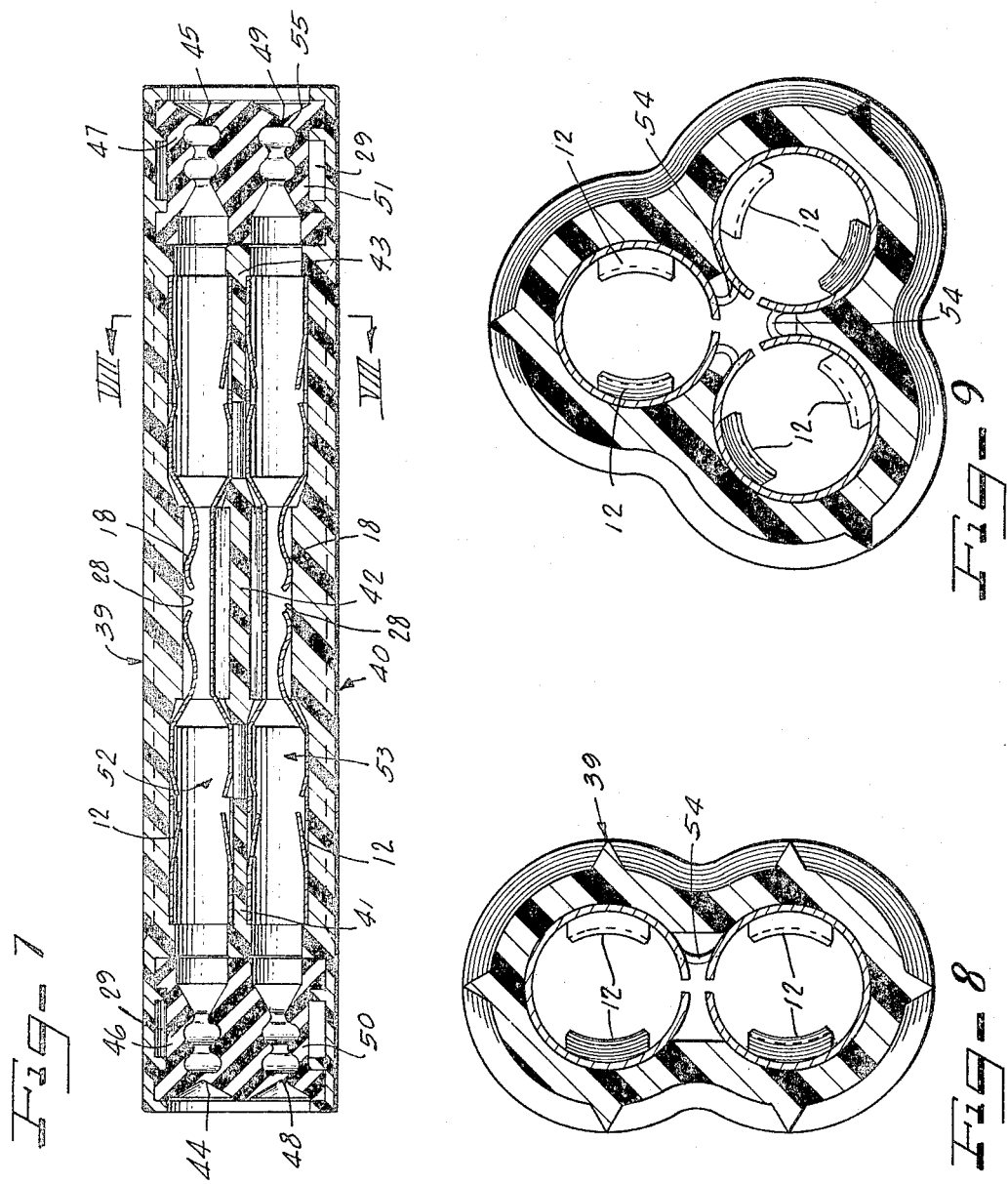

3,383,643
WIRE SPLICING DEVICE HAVING A CANTILEVER CONTACT ARM
Joseph A. Nava, Villa Park, Jack F. Shearer, Lake Forest, and Alvin R. Burton, Northbrook, Ill., assignors to The Pyle-National Company, Chicago, Ill., a corporation of New Jersey
Continuation-in-part of application Ser. No. 484,657, Sept. 2, 1965. This application Feb. 2, 1966, Ser. No. 524,382
3 Claims. (Cl. 339—205)

ABSTRACT OF THE DISCLOSURE

A wire splicing device having an insulating cover and a generally hollow interior with a generally tubular internal connector portion positioned within said cover at said hollow interior. The internal connector has radially inwardly extending tines for gripping a collar of the contact ends of a pair of wires and, in addition, has a cantilever supported resilient pressure contact arm extended axially inwardly within the hollow interior for making contact with the innermost portion of a pair of wires to be spliced.

---

This application is a continuation-in-part of our copending application Ser. No. 484,657, filed Sept. 2, 1965.

This invention relates to quick operating wire splicing devices wherein wire ends are provided with external contacts and are detachably connected together in any combination. In particular this invention relates to an internal splice contact having cantilever pressure arms for maintaining a uniform electrical connection with an external wire contact and for maintaining the contact contaminant and moisture free both prior to and during connection.

This invention is particularly applicable where it is desirable to form a common splice between a multiplicity of wires without resorting to relatively expensive connectors and cumbersome interconnections, and where the splicing device can quickly connect and disconnect the wires.

A quick splicing device has proven to be highly desirable for a variety of circumstances. However, the environment in which such devices may be employed often offers shock, vibration and thermo-variations which tend to disrupt the cooperable electrical connections. Furthermore, the electrical systems in which such a splicing device may be an integral part may require that the electrical circuit be not interrupted for even the small interval of time experienced through conditions such as vibration and shock.

In addition to the need for a continuous electrical connection between the contacts of a wire splicing device, means must be provided to assure that the contacts remain clean of foreign materials prior to the use of the splicing device. Dust or other foreign particles collected at a wire splicing contact can readily disrupt or hinder the proper functioning of a sensitive electrical network.

Therefore it is a principal object of this invention to provide a quick splice device which is suitable for being used under varying environmental circumstances.

It is also an object of this invention to provide a wire splice device which employs a resilient internal spring member for assuring a continuous electrical contact during environmental experiences such as vibration, shock and thermo-variations.

It is another object of this invention to provide a readily detachable wire splice unit which is maintained free of dust, moisture, and other foreign particles both prior to and during the splicing operation.

It is a further object of this invention to provide a quick wire splice mechanism for splicing a single set or a plurality of sets of wire members wherein the unspliced contacts are maintained free of dust, moisture, and other foreign particles.

These and other objects featuring the advantages of the present invention will be understood in greater detail from the following description and the associated drawings wherein reference numerals are utilized in designating an illustrative embodiment.

On the drawings:

FIGURE 1 is a development of a metal strip used in forming the internal common electrical contact of the wire splice device of this invention;

FIGURE 2 is a sectional view of the metal strip as shown in FIGURE 1 after it has been rolled into a generally cylindrical form;

FIGURE 3 is a sectional view taken along the line III—III of FIGURE 2 and illustrating the structure of the cantilever pressure arms used in this invention;

FIGURE 4 is an end view of the generally cylindrical contact of FIGURE 2;

FIGURE 5 is a sectional view of a wire splice device according to this invention and incorporating the internal contact member of FIGURE 2;

FIGURE 6 is a sectional view taken along the line VI—VI of FIGURE 5 showing the gripping members of the quick splice device of this invention;

FIGURE 7 is a sectional view of a splicing device which is a multiple form of the device shown in FIGURE 5;

FIGURE 8 is a sectional view taken along the line VIII—VIII of FIGURE 7 and illustrating the gripping members of the individual internal contacts and an intercontact connection; and FIGURE 9 is a view similar to FIGURE 8 showing a quick splicing mechanism where three sets of wires may be joined in a common splice.

As shown on the drawings:

The present invention contemplates a splicing device wherein the principles of construction may be utilized to provide a single splice between a single pair of wires, a common splice between a multiplicity of paired wires, or a multiplicity of single wire splices between corresponding paired wires. The splice of this invention is capable of withstanding shock, vibration and thermo-variations without breaking the electrical connection and is maintained free of foreign particles and moisture prior to and after splicing operation.

According to one aspect of this invention an electrical connection between the wires is provided by a formed electrically conductive metal strip which also acts to retain the wires in position. When a plurality of such strips are provided they can be bridged together to form a common splice between a number of wires, or the strips can be utilized as separate individual pieces to form multiple single wire splices.

The metal strip which is formed to provide the internal electrical contact of the wire splice device of this invention is shown in FIGURE 1 and is indicated generally by the reference numeral 10. The metal strip 10 is formed with a series of inner tines 11 and a pair of outer tines 12. The outer tines 12 are utilized to resiliently grip the external contact for maintaining a firm connection between that contact and the metal strip 10. The inner tines 11 when formed as indicated in FIGURE 2 are used to prevent the excessive projection of the external contact within the splicing device.

End portions 13 of the metal strip 10 are rolled into the generally cylindrical shape shown in FIGURE 2 for receiving the external contact member as shown on FIGURE 5. The end portions 13 are provided with tabs 14 which are received within cooperable notches 15 for maintaining the alignment of the rolled assembly.

The central portion of the metal strip is provided with symmetrically disposed connection members 16 and 17 and cantilever supported pressure arms 18 and 19. As shown in FIGURE 2 the connector members 16 and 17 provide an electrical connection between the generally cylindrically formed end portions 13 of the metal strip 10. The cantilever supported members 18 and 19 are formed to have the convex concave configuration of FIGURE 2 for maintaining a continuous pressure on the external connector as illustrated in FIGURE 5. It is the continuous pressure of the cantilever supported members 18 and 19 that maintains the uniformity of the electrical connection between the external contact members during conditions of shock, vibration and thermo-variations.

In FIGURE 1 the connection members 16 and 17 consist essentially of plane members having cut-out sections 20 and 21. The cut-out sections 20 and 21 provide flaps 22 for the connection members 16 and 17 which may be folded as shown in FIGURE 2 to offer a firm but resilient support to an external contact member received therein. However, the major resiliency is provided by the cantilever members 18 and 19 which are formed to have a convex portion 23 and a concave portion 24. The convex portion 23 is provided to contact the external pin as received within the cylindrically formed end portion 13. The concave end 24 contacts the inner wall of the insulating cover as shown in FIGURE 5, and the combination of the concave and convex portions exert a spring-like effect on the external pin contact. The result is a continuity of electrical connection even under conditions of high physical stress.

The entire quick splice device of this invention is shown assembled in FIGURE 5. In FIGURE 5 a generally tubular insulating cover 25 is formed to have a hollow interior 26 for receiving the internal contact member as shown in FIGURE 2. The hollow interior 26 has a first cylindrical wall portion 27 for receiving the end portion 13 of the internal contact member of FIGURE 2. Centrally of the tubular insulating cover 25 is a restricted cylindrical wall portion 28. The wall portion 28 is provided to receive the restricted portion of the internal contact member indicated by the elements 16 through 19.

The insulating cover 25 has opened end sections 29 characterized by inwardly extending flanges 30 and 31 for receiving a rim 32 of a molded rubber end seal 33. The rubber seal 33 is provided with a series of grip surfaces 34 for providing a dust-free seal with an external pin connector.

The pin connectors used to make the wire splice of this invention are shown positioned within the internal connector in FIGURE 5. Generally, the pin connector consists of a standardized cylindrical contact 35 having a shank portion 36 and a shoulder 37. The connector comprising the portions 35, 36 and 37 is rigidly secured in a well understood manner to a wire or a cable 38. The contact 35 is positioned between the cantilever member 18 and the plane connecting member 16. The shank portion 36 is disposed axially within the cylindrically formed end portion 13 and the shoulder 37 is locked between opposing tines 11 and 12. Therefore, while the continuity of the electrical contact is provided by the cylindrical portion 35 in combination with the cantilever member 18, the axial mobility of the external connector is provided by the shoulder 37 in combination with the oppositely orientated tines 11 and 12. During insertion of the external contact within the internal contact of FIGURE 5 the shoulder 37 easily spreads the tines 12 outwardly from the position in FIGURE 5 and gains a locked position between those tines and the oppositely directed tines 11.

In FIGURE 5 the cantilever spring 18 is backed up by the inner surface 28 of the insulating cover 25 to convert the cantilever beam to a simply supported beam and limit its deflection to within the yield stress. Concurrently, it provides sufficient support to create the necessary normal forces to the pin contact to assure adequate and continuous electrical continuity during environmental experiences such as shock, vibration and thermo-variations.

A quick splicing device having the feature of this invention in which a number of sets of paired wires may be joined is shown generally in FIGURES 7, 8 and 9.

In FIGURE 7 a splicing device similar to that shown in FIGURE 5 is illustrated in dual form. Essentially, two splicing devices 39 and 40 similar to the structure of FIGURE 5 are joined as at 41, 42 and 43 to result in a single splicing unit which has a capacity for receiving two sets of paired wires. The first set may be received within openings 44 and 45 of end seals 46 and 47, while the second set may be received within openings 48 and 49 or of end seals 50 and 51, respectively. The resulting spliced pairs of wires may be maintained separate by providing insulating members as at 41, 42 and 43 between the internal contacts 52 and 53. In contrast a joint splice may be accomplished by providing electrical connectors 54 between the contact members 52 and 53 as shown in FIGURE 8.

Although the quick splicing units shown in FIGURES 7, 8 and 9 are developed for multiple splicing of paired wires, the individual units may be used for the splicing of wired sets less in number than the number of available splicing connections. In such cases it is highly desirable that the unused connections be maintained contaminant and moisture free for later use. Accordingly this invention provides a continuous diaphragm 55 across the openings to the end seals. In this way the interior of the assembly is maintained in a state free of foreign particles prior to use and is likewise maintained contaminant and moisture free during use as the grip surfaces 34 fit tightly about the wire or cable 38 as shown in FIGURE 5.

FIGURE 9 illustrates a further embodiment of the multiple splicing device of this invention wherein three individual splicing units as shown in FIGURE 5 are pair-mated to form a single triple-splicing assembly corresponding to the double assembly shown in FIGURE 7.

It will be understood that various modifications of the embodiment disclosed herein may be accomplished by those versed in the art, but we desire to claim all such embodiments as properly come within the scope and spirit of our invention.

We claim:
1. The combination comprising:
   a pair of external contacts for terminating the ends of two wires to be spliced,
   a metal strip formed into a generally tubular configuration and having a central reduced socket portion, electrically receiving said external contacts,
   said strip and said external contacts having at opposite sides of said socket portion interconnected collet tines and abutment shoulders respectively for effecting a coupling connection between the wires, at least one of said tines extending radially inwardly of said tubular configuration and being directed axially inwardly thereof,
   said central reduced socket portion having cantilever supported resilient contact arms extending therefrom for making a pressurized contact with said external contacts,
   at least another of said tines extending radially inwardly of said tubular configuration and being directed axially outwardly thereof,
      said other tines being extended from a point on said tubular configuration which is spaced axially inwardly of the innermost point of said one tine.

2. In a wire splice assembly:
a current continuing spring member made of sheet-form material struck-out and shaped to provide:
    a pair of axially spaced cylindrical portions each having radially inwardly directed opposed pairs of tines forming collets for engaging and retaining the shoulder of a pin connector inserted thereinto,
and a central portion of said current continuing member having two flat symmetrically disposed connection members comprising plate portions extending axially between said cylindrical portions,
    said plate portion being outwardly flanged for rigidification,
    and a cantilever supported spring pressure arm extending axially inwardly from each respective cylindrical portion to overlie said plate portions,
thereby to clamp the contact portion of a pin connector inserted thereinto both mechanically and electrically,
    an insulating cover of generally tubular configuration into which said spring member is inserted,
    said cover having a radially inwardly extending portion closely confronting each respective spring pressure arm,
thereby to convert the cantilever beam action of said spring pressure arm to that of a simply supported beam limiting deflection so that the normal forces to pin contact will assume electrical continuity during shock, vibration and thermal variations.

3. In a wire splice assembly as defined in claim 2 wherein said insulating cover has an integral rupturable diaphragm at each end thereof to completely seal the cavity of each individual splice until a pin connector is inserted into the cover to rupture a coresponding diaphragm.

References Cited
UNITED STATES PATENTS

| | | | |
|---|---|---|---|
| 2,158,004 | 5/1939 | Douglas | 339—204 |
| 2,380,916 | 8/1945 | Beal | 339—205 |
| 2,392,438 | 1/1946 | Wade | 339—205 |
| 2,431,583 | 1/1947 | Penfold | 339—205 |
| 2,463,826 | 3/1949 | Thacker. | |
| 2,758,291 | 8/1956 | Richards | 339—205 |
| 2,935,720 | 5/1960 | Lorimer | 339—205 |
| 3,079,582 | 2/1963 | Lazar. | |
| 3,143,385 | 8/1964 | Zimmerman et al. | |
| 3,158,424 | 11/1964 | Bowen. | |
| 3,182,281 | 5/1965 | Salz | 339—253 |
| 3,206,717 | 9/1965 | Brown et al. | 339—205 |

MARVIN A. CHAMPION, *Primary Examiner.*

RAYMOND S. STROBEL, *Assistant Examiner.*